United States Patent
Yi et al.

(10) Patent No.: US 11,956,557 B1
(45) Date of Patent: Apr. 9, 2024

(54) PIXEL ARCHITECTURE WITH HIGH DYNAMIC RANGE

(71) Applicant: BAE Systems Imaging Solutions Inc., San Jose, CA (US)

(72) Inventors: Xianmin Yi, Menlo Park, CA (US); Alexander Lu, San Jose, CA (US)

(73) Assignee: BAE Systems Imaging Solutions Inc., San Jose, CA (US)

( * ) Notice: Subject to any disclaimer, the term of this patent is extended or adjusted under 35 U.S.C. 154(b) by 0 days.

(21) Appl. No.: 17/967,021

(22) Filed: Oct. 17, 2022

(51) Int. Cl.
| | |
|---|---|
| H04N 25/59 | (2023.01) |
| H04N 25/63 | (2023.01) |
| H04N 25/71 | (2023.01) |
| H04N 25/74 | (2023.01) |
| H04N 25/75 | (2023.01) |
| H04N 25/77 | (2023.01) |

(52) U.S. Cl.
CPC .......... *H04N 25/59* (2023.01); *H04N 25/71* (2023.01); *H04N 25/74* (2023.01); *H04N 25/75* (2023.01); *H04N 25/77* (2023.01); *H04N 25/63* (2023.01)

(58) Field of Classification Search
CPC ........ H04N 25/59; H04N 25/71; H04N 25/74; H04N 25/75; H04N 25/77; H04N 25/63
See application file for complete search history.

(56) References Cited

U.S. PATENT DOCUMENTS

| | | | |
|---|---|---|---|
| 7,075,049 B2 | 7/2006 | Rhodes et al. | |
| 7,420,154 B2 | 9/2008 | Shah | |
| 7,442,910 B2 | 10/2008 | Fossum | |
| 7,518,645 B2 | 4/2009 | Farrier | |
| 7,623,169 B2 | 11/2009 | Apte | |
| 7,705,900 B2 | 4/2010 | Guidash | |
| 7,830,437 B2 | 11/2010 | McKee et al. | |
| 8,426,796 B2 | 4/2013 | Mao et al. | |
| 8,704,926 B2 | 4/2014 | Schemmann et al. | |

(Continued)

FOREIGN PATENT DOCUMENTS

| | | | | |
|---|---|---|---|---|
| JP | 2017153011 | * | 8/2017 | ........... H04N 51/028 |
| JP | 2017153011 A | | 8/2017 | |

OTHER PUBLICATIONS

International Search Report, PCT/US23/34339, dated Oct. 31, 2023, 7 pages.

*Primary Examiner* — Nhan T Tran
(74) *Attorney, Agent, or Firm* — Finch & Maloney PLLC; Gary McFaline (57) ABSTRACT

A given pixel of a pixel array includes various operation modes with each of the operation modes having a different conversion gain for the charge received from the photodetector of the pixel. When the modes are used in conjunction with one another, the dynamic range of the pixel can be increased. A readout circuit coupled to a photodetector within a given pixel includes a transfer gate between the photodetector and a gain mode select block that includes capacitors of different sizes and one or more switches to control which capacitors are to receive the charge from the photodetector. Depending on the state(s) of the one or more switches, different operation modes with different conversion gains can be selected to increase the dynamic range of the pixel. The adaptability of the readout circuit can allow for a high dynamic range even in extreme temperature environments by lowering the dark current.

17 Claims, 7 Drawing Sheets

(56) References Cited

U.S. PATENT DOCUMENTS

| | | | |
|---|---|---|---|
| 8,896,733 B2 | 11/2014 | Solhusvik | |
| 9,041,842 B2 | 5/2015 | Willassen | |
| 9,106,851 B2 | 8/2015 | Fenigstein et al. | |
| 9,167,182 B2 | 10/2015 | Parks | |
| 9,402,039 B2 | 7/2016 | Solhusvik et al. | |
| 9,584,745 B2 | 2/2017 | Ladd | |
| 9,729,808 B2 | 8/2017 | Fenigstein et al. | |
| 9,807,323 B2 | 10/2017 | Ganguly et al. | |
| 9,843,738 B2 | 12/2017 | Cremers et al. | |
| 9,888,191 B2 | 2/2018 | Beck | |
| 9,942,502 B2 | 4/2018 | Borremans | |
| 10,171,760 B2 | 1/2019 | Otaka | |
| 10,362,255 B2 | 7/2019 | Johnson et al. | |
| 10,498,991 B2 | 12/2019 | Van Der Tempel | |
| 10,560,646 B2 | 2/2020 | Milkov et al. | |
| 10,574,913 B2 | 2/2020 | Douence et al. | |
| 10,638,066 B2 | 4/2020 | Kobayashi et al. | |
| 10,741,592 B2 | 8/2020 | Innocent | |
| 10,785,425 B2 | 9/2020 | Winzenread | |
| 10,785,430 B2 | 9/2020 | Ikuma et al. | |
| 11,089,253 B2 | 8/2021 | Shim et al. | |
| 11,258,977 B2 | 2/2022 | Lule | |
| 11,343,439 B2 | 5/2022 | Johnson | |
| 11,658,201 B2 * | 5/2023 | Chen | H04N 25/77 348/308 |
| 2004/0251394 A1 * | 12/2004 | Rhodes | H04N 25/587 348/E3.019 |
| 2007/0035649 A1 | 2/2007 | McKee | |
| 2009/0096890 A1 * | 4/2009 | Li | H04N 25/771 348/E5.022 |
| 2009/0237540 A1 | 9/2009 | Johnson | |
| 2010/0044552 A1 | 2/2010 | Chen | |
| 2021/0029312 A1 * | 1/2021 | Geurts | H04N 25/616 |
| 2022/0385852 A1 * | 12/2022 | Miyauchi | H04N 25/62 |

\* cited by examiner

PIXEL ARCHITECTURE WITH HIGH DYNAMIC RANGE

BACKGROUND

Image sensors are widely used for a number of different applications across a large portion of the electromagnetic spectrum. Many image sensor designs use an array of sensors to capture light across a given area. Each sensor may be considered a single pixel of the sensor array, with the pixels arranged in any number of rows and columns. Each pixel includes some form of photodetector as well as a circuit to collect the charge from the photodetector in response to a light input. A number of non-trivial issues exist with regard to the design of the circuit to provide both a high dynamic range and a high conversion gain.

These and other features of the present embodiments will be understood better by reading the following detailed description, taken together with the figures herein described.

DETAILED DESCRIPTION

Structures are disclosed for a given pixel of a pixel array that allows for various operation modes for the given pixel. Each of the operation modes can have a different conversion gain for the charge received from the photodetector. When the modes are used in conjunction with one another, the overall dynamic range of the pixel can be increased. According to some embodiments, a readout circuit coupled to a photodetector within a given pixel includes a transfer gate between the photodetector and a gain mode select block. The gain mode select block includes capacitors of different sizes and one or more switches to control which capacitors are to receive the charge from the photodetector. Depending on the state(s) of the one or more switches, different operation modes with different conversion gains can be selected to increase the dynamic range of the pixel. In an example first operation mode, a first capacitor is selected to store the charge from the photodetector. In an example second operation mode, the first capacitor in parallel with a second capacitor are selected to store the charge from the photodetector. In an example third operation mode, the first capacitor, the second capacitor, and a third capacitor in parallel with each other are selected to store the charge from the photodetector. The photodetector signal during any operation mode can be amplified, for example, via a source follower component and ultimately read out to a column amplifier. The adaptability of the readout circuit can allow for a high dynamic range even in extreme temperature environments by lowering the dark current throughout the circuit.

General Overview

As previously noted, there a number of non-trivial issues that remain with respect to designing a readout circuit for a photodetector. For example, it can be challenging to achieve a high dynamic range and still maintain a high conversion gain from the charge received from the photodetector. The dynamic range of a photodetector generally refers to the maximum light intensity that can be received while remaining within a linear operation regime for the readout circuit. Accordingly, photodetector architectures with a higher dynamic range are capable of receiving higher intensity light that can be accurately represented as an electrical signal. The conversion gain generally refers to how much voltage can be generated per electron of charge from the photodetector. There can exist a trade off in many circumstances between conversion gain and dynamic range, as a high conversion gain may be less prone to noise but can limit the dynamic range.

Thus, and in accordance with an embodiment of the present disclosure, techniques are disclosed for designing a readout circuit that can read the charge from a photodetector while leveraging the advantages of having both a high conversion gain and a high dynamic range. The readout circuit and photodetector may be part of a single pixel that is one pixel of an array of similarly designed pixels. The sensor array of pixels may be, for example, any type of charge coupled device (CCD) designed to receive light for the purpose of generating an image from the light received across the sensor array. Other pixel-based imaging arrays may also benefit.

According to some embodiments, a pixel circuit (or more simply, a pixel) of a pixel array (e.g., in row-column format) includes a readout circuit coupled to a photodetector. A sensing node in the readout circuit is configured to be coupled to one or more different capacitors based on the state of two or more switches within the readout circuit. Changing which capacitors are used to store charge from the sensing node is representative of changing the operation mode of the readout circuit. Each operation mode may have a different conversion gain for the charge read from the photodetector based on the total capacitance coupled to the sensing node, according to some embodiments. For example, the state of a first switch may be used to select between a first operation mode having a first capacitor coupled to the sensing node and a second operation mode having the first capacitor and a second capacitor coupled to the sensing node. Furthermore, the state of both the first switch and a second switch may be used to select a third operation mode having the first capacitor, the second capacitor, and a third capacitor coupled to the sensing node. A different conversion gain may be achieved for each operation mode due to the varying levels of capacitance for storing the photodetector charge. Note that any one of the capacitors may effectively be formed of or otherwise include parasitic capacitance associated with the sensing node, and/or an actual capacitor coupled to the sensing node. In some embodiments, a given conversion gain associated with the first operation mode decreases by a factor of 10 when compared to the second operation mode and decreases by a factor of 100 when compared to the third operation mode. For each operation mode, the charge received from the photodetector may be used to generate a current signal that is ultimately fed to a column amplifier or other amplifier element before being converted into a digital signal via an analog-to-digital converter (ADC).

According to an example embodiment, a CCD includes a plurality of pixels with at least one pixel of the plurality of pixels having a photodetector, a transfer gate coupled to an output of the photodetector, and a gain mode select block coupled to an output of the transfer gate. The gain mode select block includes a first switch coupled between a first node and a second node and a second switch coupled between the second node and a third node. The first node is coupled to a first capacitor, the second node is coupled to a second capacitor, and the third node is coupled to a third capacitor. According to some embodiments, the first capacitor has a higher capacitance than the second capacitor, and the second capacitor has a higher capacitance than the third capacitor, or vice-versa where the third capacitor has a higher capacitance than the second capacitor, and the second capacitor has a higher capacitance than the first capacitor. Again, any one of the three capacitors may be implemented with parasitic capacitance only, or a combination of parasitic capacitance and an actual capacitor, or just an actual capacitor. According to some such example embodiments, a resistive element is coupled between an output of the photodetector and the third node, such as a field effect transistor (FET) that is biased on to provide a consistent potential barrier.

According to another example embodiment, an image sensor includes a pixel array having at least one column of addressable pixels, a column amplifier coupled to the at least one column of addressable pixels, an analog-to-digital converter (ADC) coupled to the column amplifier, and a processor coupled to the ADC. The at least one column of addressable pixels includes at least one pixel circuit that includes a photodetector, a transfer gate coupled to an output of the photodetector, and a gain mode select block coupled to an output of the transfer gate. The gain mode select block includes a first switch coupled between a first node and a second node and a second switch coupled between the second node and a third node. The first node is coupled to a first capacitor, the second node is coupled to a second capacitor, and the third node is coupled to a third capacitor. Note that pixel and pixel circuit may be used interchangeably herein, for ease and brevity of communication.

According to another example embodiment, a pixel of a pixel array within a CCD device includes a photodetector, a transfer gate having a first terminal coupled to an output of the photodetector, a first capacitor coupled to a second terminal of the transfer gate, a first switch having a first terminal coupled to the second terminal of the transfer gate, a second capacitor coupled to a second terminal of the first switch, a second switch having a first terminal coupled to the second terminal of the first switch, and a third capacitor coupled to a second terminal of the second switch.

The description uses the phrases "in an embodiment" or "in embodiments," which may each refer to one or more of the same or different embodiments. Furthermore, the terms "comprising," "including," "having," and the like, as used with respect to embodiments of the present disclosure, are synonymous.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order from the described embodiment. Various additional operations may be performed, and/or described operations may be omitted in additional embodiments.

System Architecture

Figure 1:
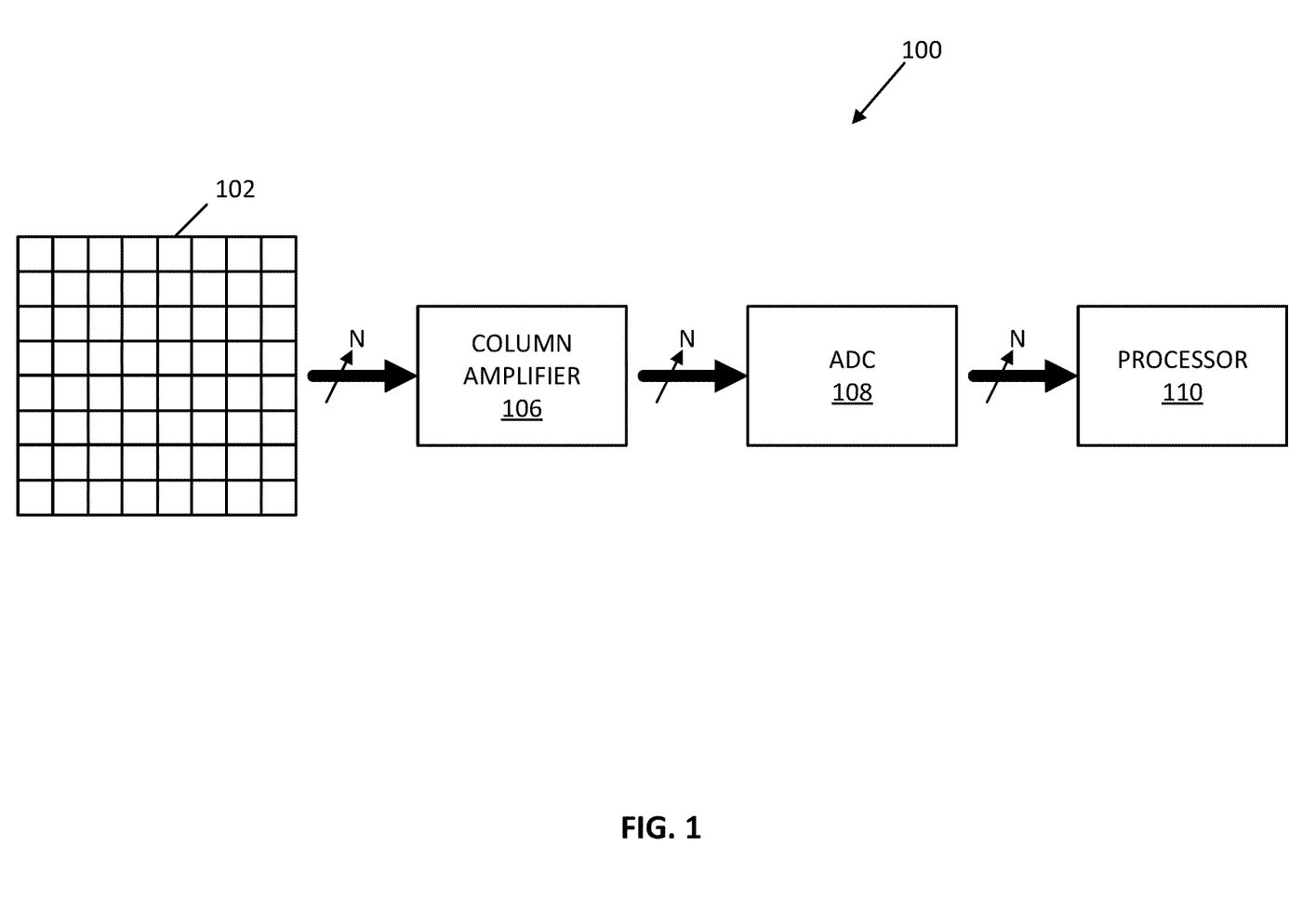
FIG. 1 is a block diagram of an image sensor that uses a pixel array, in accordance with an embodiment of the present disclosure.

FIG. 1 is a block diagram of an example image sensor 100, according to some embodiments. Image sensor 100 may represent or be an integral part of a charge coupled device (CCD) camera or other type of imaging device. In some embodiments, image sensor 100 may be configured for capturing different portions of the electromagnetic spectrum, such as visible light, ultraviolet radiation, infrared radiation, or x-rays, to name a few examples. Image sensor 100 may include a pixel array 102, a column amplifier 106, an ADC 108, and a processor 110. Each of the illustrated components may be included together on same printed circuit board (PCB) or together in a single chip package (e.g., a system-in-package or system-on-chip). In some other embodiments, any one or more of the elements may be provided in a separate chip package and/or on separate PCBs.

According to some embodiments, pixel array 102 includes a plurality of pixels arranged in a row-column format. Each pixel of pixel array 102 may have a similar architecture that includes a photodetector and a readout circuit. The photo detection area of each pixel on which incident radiation may impinge may vary from one embodiment to the next, but in some example cases has a physical size of around 1 µm×1 µm up to around 5 µm×5 µm. Likewise, the shape and lensing (if present) of the photo detection area (e.g., photo diode) can also vary from one example to the next, depending on factors such as desired fill factor of the array. According to some embodiments, each row of pixels may be coupled together via a common row-select line (e.g., a wordline), to provide separately addressable rows of pixels.

According to some embodiments, the outputs from N different columns of pixels are received by column amplifier 106. According to some embodiments, column amplifier 106 represents N separate column amplifiers with a given column amplifier configured to receive the output from a corresponding column of pixels from pixel array 102. In this way, a given row of pixels from pixel array 102 can be selected via a row-select line and simultaneously read out via the N column amplifiers 106. According to some embodiments, column amplifier 106 may include any type of amplifier configuration, such as any number of source follower FETs or operational amplifiers. In some embodiments, a single column amplifier 106 may be used in conjunction with a multiplexer to receive each of the N column outputs from pixel array 102.

According to some embodiments, the output(s) from column amplifier 106 is/are received by ADC 108. As noted above, ADC 108 may represent N different ADCs with a given ADC configured to receive the output from a corresponding column amplifier 106. ADC 108 may be any known type of ADC without limitation.

Processor 110 may be configured to receive the digitized signal from ADC 108 (or N digitized signals across N ADCs) and perform any number of operations with the signal(s). For example, processor 110 may receive the signal data from a given row of pixels of pixel array 102 and use the signal data to create an image or a portion of an image captured via pixel array 102. As used herein, the term "processor" may refer to any device or portion of a device that processes electronic data from registers and/or memory to transform that electronic data into other electronic data that may be stored in registers and/or memory. Processor 110 may include one or more digital signal processors (DSPs), application-specific integrated circuits (ASICs), central processing units (CPUs), graphics processing units (GPUs), cryptoprocessors (specialized processors that execute cryptographic algorithms within hardware), server processors, custom-built semiconductor, or any other suitable processing devices.

Pixel Design

Figure 2:
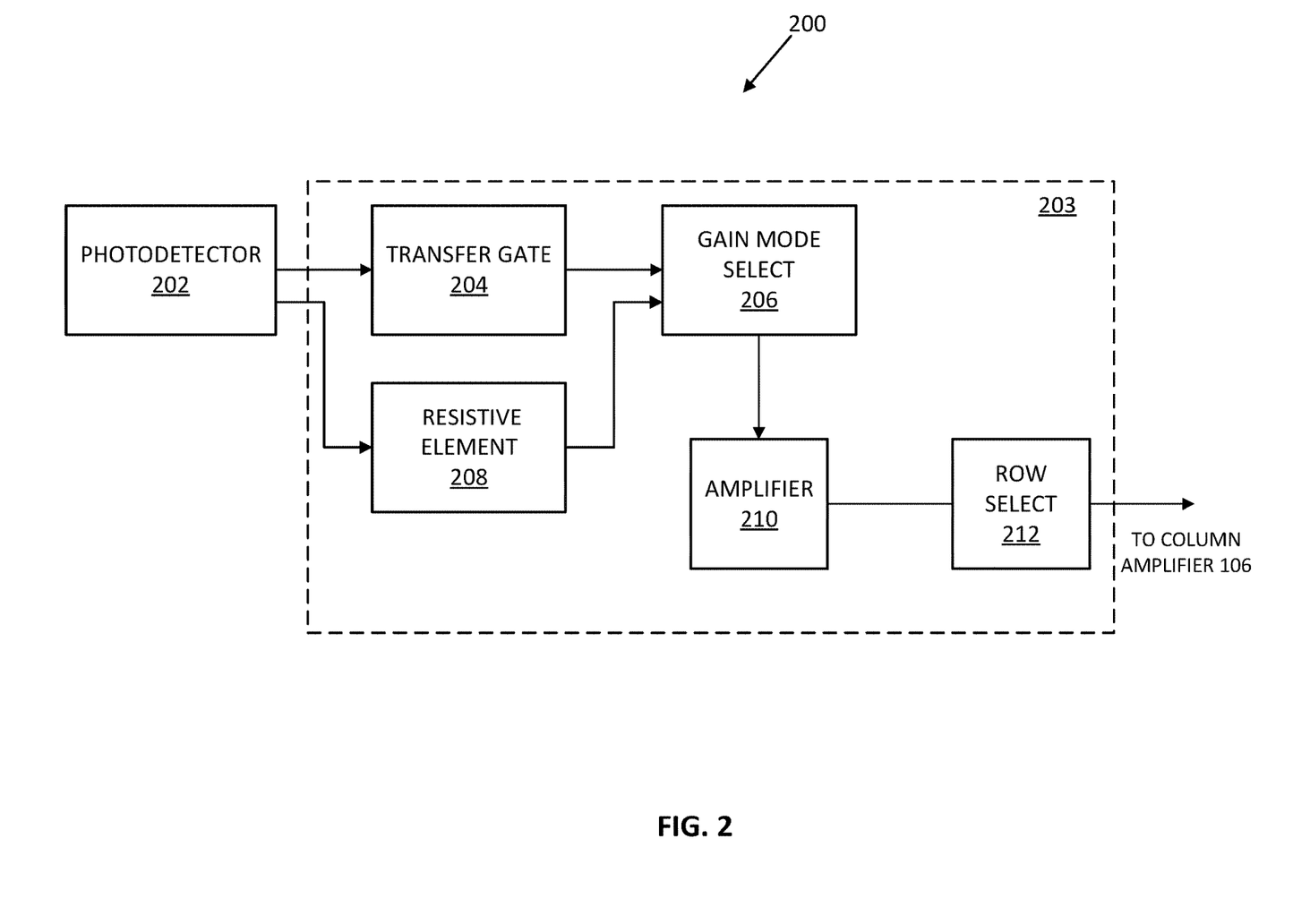
FIG. 2 is a block diagram illustrating the various components of a single pixel of the pixel array of FIG. 1, in accordance with an embodiment of the present disclosure.

FIG. 2 illustrates a block diagram of a pixel 200 from pixel array 102 that includes a photodetector 202 and a readout circuit 203, according to some embodiments. Photodetector 202 may include any type of photosensitive design, such as a PN diode. Note that the term pixel may refer to a functional pixel circuit and not just the photo detection area of a given pixel.

According to some embodiments, readout circuit 203 includes a transfer gate 204 coupled to an output of photodetector 202. As described above, the active area of the photodetector 202 (e.g., the area which is sensitive to impinging light and generates a corresponding signal based on intensity of that light), as well as any lensing, can vary depending on the given application. Transfer gate 204 acts like a gatekeeper to the charge generated by photodetector 202 in response to a light input. In some embodiments, transfer gate 204 may include a single field effect transistor (FET), such as a p-doped or n-doped metal oxide semiconductor device (PMOS or NMOS), or any number of FETs that carry out a similar function.

Transfer gate 204 is configured to allow charge from photodetector 202 to pass on to gain mode select block 206, where the charge is stored across selected one or more capacitors, according to some embodiments. Gain mode select block 206 may include, for instance, two or more switches and any number of capacitors, where a state of the switches can be used to select a conversion gain mode to operate in. For example, two switches and three capacitors can be arranged to allow for three different conversion gain modes, although other layouts may include more switches and/or more capacitors to create any number of additional conversion gain modes. Further recall from above that any one of the capacitors may be implemented with parasitic capacitance, or a combination of parasitic capacitance and an actual capacitor device. The charge that passes through transfer gate 204 may be stored at a given conversion gain based on which capacitors have been coupled to a sensing node within gain mode select block 206.

According to some embodiments, a resistive element 208 is also coupled between an output of photodetector 202 and a portion of gain mode select block 206. Resistive element 208 may be, for example, an NMOS or PMOS device that is biased on to create a controllable potential barrier based on how much bias is applied to the gate of the NMOS or PMOS device. In some other examples, resistive element 208 may be a resistor or a PN junction biased to provide a given potential barrier.

According to some embodiments, the sensing node from gain mode select block 206 that is coupled to selected one or more capacitors is further coupled to amplifier 210 to generate an output signal. Amplifier 210 may be implemented, for example, as a single source-follower NMOS or PMOS device, or as an operational amplifier.

According to some embodiments, a row select switch 212 is included within readout circuit 203. Row select switch 212 may have a gate or select input that is coupled to a common row-line (e.g., a wordline) with other pixels of the same row. Accordingly, when the current row is activated to read out from, row select switch 212 is activated and turned on to read out the output signal to column amplifier 106. When the current row is not selected, row select switch 212 is not active and no signal is read out to column amplifier 106. Row select switch 212 may be implemented as an NMOS or PMOS device with the row-line coupled to the gate of the NMOS or PMOS device.

Figure 3:
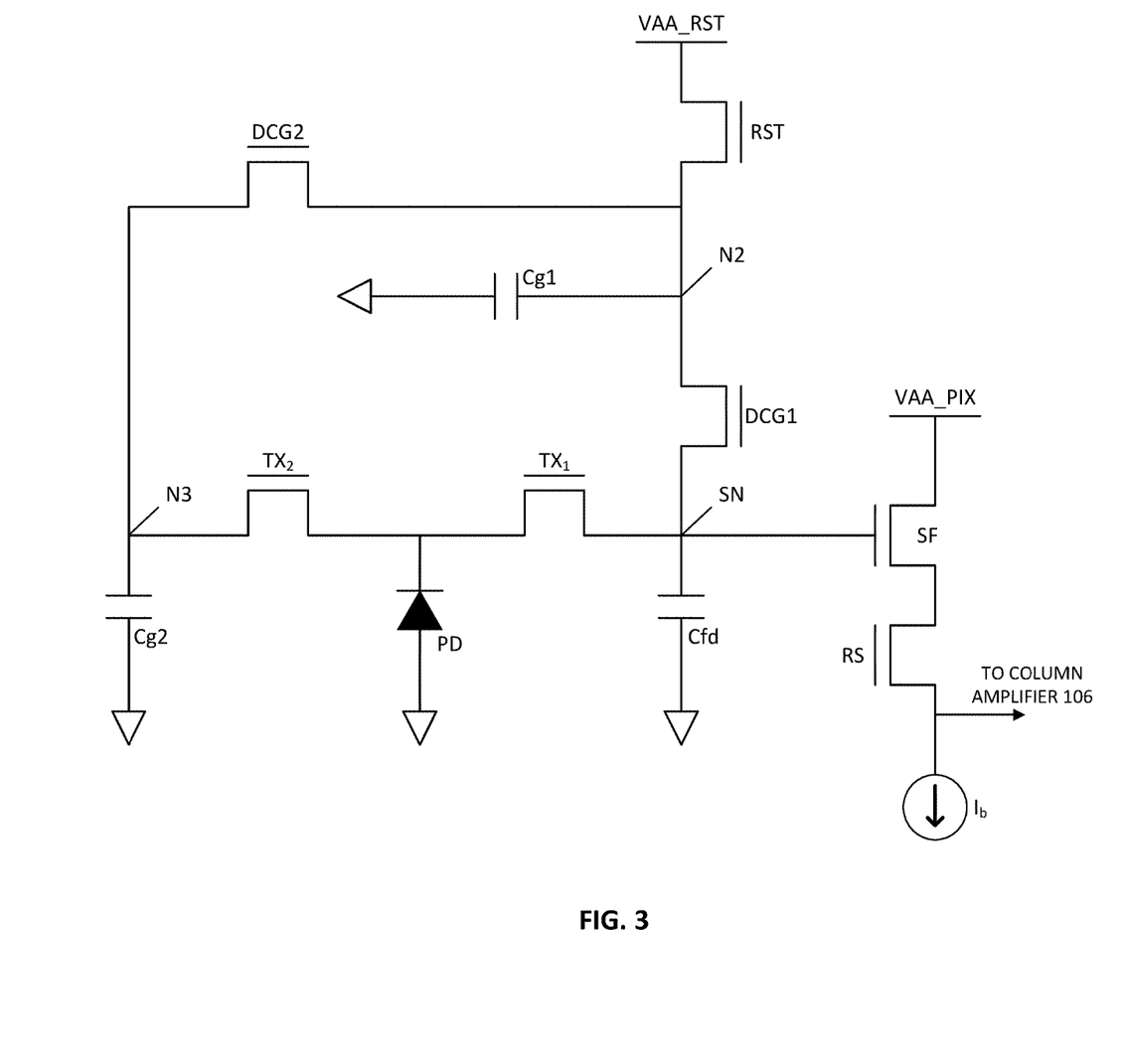
FIG. 3 is a schematic diagram illustrating the single pixel of FIG. 2, in accordance with an embodiment of the present disclosure.

FIG. 3 illustrates an example circuit schematic of any given pixel from pixel array 102, according to some embodiments. Each of the illustrated FETs may be either an NMOS or PMOS device depending on the layout. Additionally, in some embodiments, any of the FETs can be replaced with other transistor technologies, such as a bipolar junction transistor (BJT). According to some embodiments, the pixel readout circuit includes a current source $I_b$ to provide a bias current for operating the source follower amplifier SF.

Light impinges upon a photodetector PD where it is converted into electrical charge that can flow as a photocurrent. At a given moment in time, at least a portion of the converted charge is released onto a sensing node SN via a transfer gate $TX_1$ by turning $TX_1$ on for a predefined number of clock cycles. Once the charge has been released to sensing node SN, it can be stored across various combinations of capacitors depending on the state of a first switch DCG1 and a second switch DCG2. In a first example mode of operation, DCG1 is switched off (e.g., biased off), such that the charge at sensing node SN is stored only across a first capacitor Cfd. In some examples, capacitor Cfd may have a relatively small capacitance around 1 femtofarads (fF), or between about 0.2 fF and about 3 fF. The conversion gain may be relatively high in the first mode of operation, such as between about 170 µV/electron and about 200 µV/electron. In a second example mode of operation, DCG1 is switched on (e.g., biased on), and DCG2 is switched off (e.g., biased off) such that the charge at both sensing node SN and a second node N2 is stored across first capacitor Cfd in parallel with a second capacitor Cg1. In some examples, capacitor Cg1 may have a higher capacitance compared to capacitor Cfd. For example, capacitor Cg1 may have a capacitance around 10 fF, or between about 5 fF and about 15 fF. The conversion gain in the second mode of operation may be relatively lower than the conversion gain in the first mode of operation. For example, the conversion gain in the second mode of operation may be between about 17 µV/electron and about 20 µV/electron. In a third example mode of operation, DCG1 is switched on (e.g., biased on), and DCG2 is switched on (e.g., biased on) such that the charge at sensing node SN, second node N2, and a third node N3 is stored across first capacitor Cfd in parallel with second capacitor Cg1 in parallel with a third capacitor Cg2. In some examples, capacitor Cg2 may have a higher capacitance compared to capacitor Cg1. For example, capacitor Cg2 may have a capacitance around 100 fF, or between about 75 fF and about 125 fF. The conversion gain in the third mode of operation may be relatively lower than the conversion gain in the second mode of operation. For example, the conversion gain in the third mode of operation may be between about 1.7 µV/electron and about 2.0 µV/electron.

According to some embodiments, DCG1 and DCG2 have the same transistor properties. For example, each of DCG1 and DCG2 can have substantially the same W/L ratio and about the same switching speed, such that their respective W/L ratio and switching speeds are each within a given tolerance (e.g., +/−10%, or +/−5%, or +/−2%) of a target value.

In any of the aforementioned modes of operation, the stored potential (at the given conversion gain based on the mode of operation) activates the source follower amplifier SF to produce an output signal to send to column amplifier 106. Source follower amplifier SF may be a single FET device or any other amplifier structure, such as an operational amplifier. Source follower amplifier SF may be powered, for example, via rail power VAA_PIX between about 2 V and about 2.5 V or some other suitable rail voltage. The output signal produced from source follower amplifier SF can only be sent on to column amplifier 106 if the row select switch RS is biased on. According to some such examples, all pixels in a given row of pixel array 102 will share a same row select line (e.g., a word line) that couples with the gate of row select switch RS. If row select switch RS is biased off, then the current pixel is part of a row that is not currently being read from and no signal will be sent on to column amplifier 106 from the current pixel.

According to some embodiments, the potential at any of sensing node SN, second node N2, or third node N3 can be reset to a baseline or reference value via a reset switch RST. When reset switch RST is biased on, the rail voltage VAA_RST is applied to whichever nodes are coupled to the end of reset switch RST. For example, DCG1 can also be biased on when reset switch RST is biased on to apply voltage VAA_RST to both sensing node SN and first node N2, thus overriding whatever charge had been there from photodetector PD. In another example, both DCG1 and $TX_1$ can be biased on when reset switch RST is biased on to also apply voltage VAA_RST to the output node of photodetector PD. The rail voltage VAA_RST may be between about 2 V and about 2.5 V. Reset switch RST is coupled to the second node N2, however, reset switch RST may be coupled to any node within the readout circuit, such as any of sensing node SN, second node N2, or third node N3.

According to some embodiments, a resistive element $TX_2$ is arranged between an output of photodetector PD and third node N3. In the illustrated example, $TX_2$ is a FET that can be biased on to provide an adjustable potential barrier (variable resistor) based on the amount of voltage applied to the gate. In other examples, resistive element $TX_2$ can be implemented with a resistor having a permanent resistance value or any doped junction to provide a potential barrier. The presence of resistive element $TX_2$ allows for some charge from the photodetector to leak across resistive element $TX_2$ onto third node N3 at any time.

Timing Diagrams for Various Operation Modes

Figure 4:
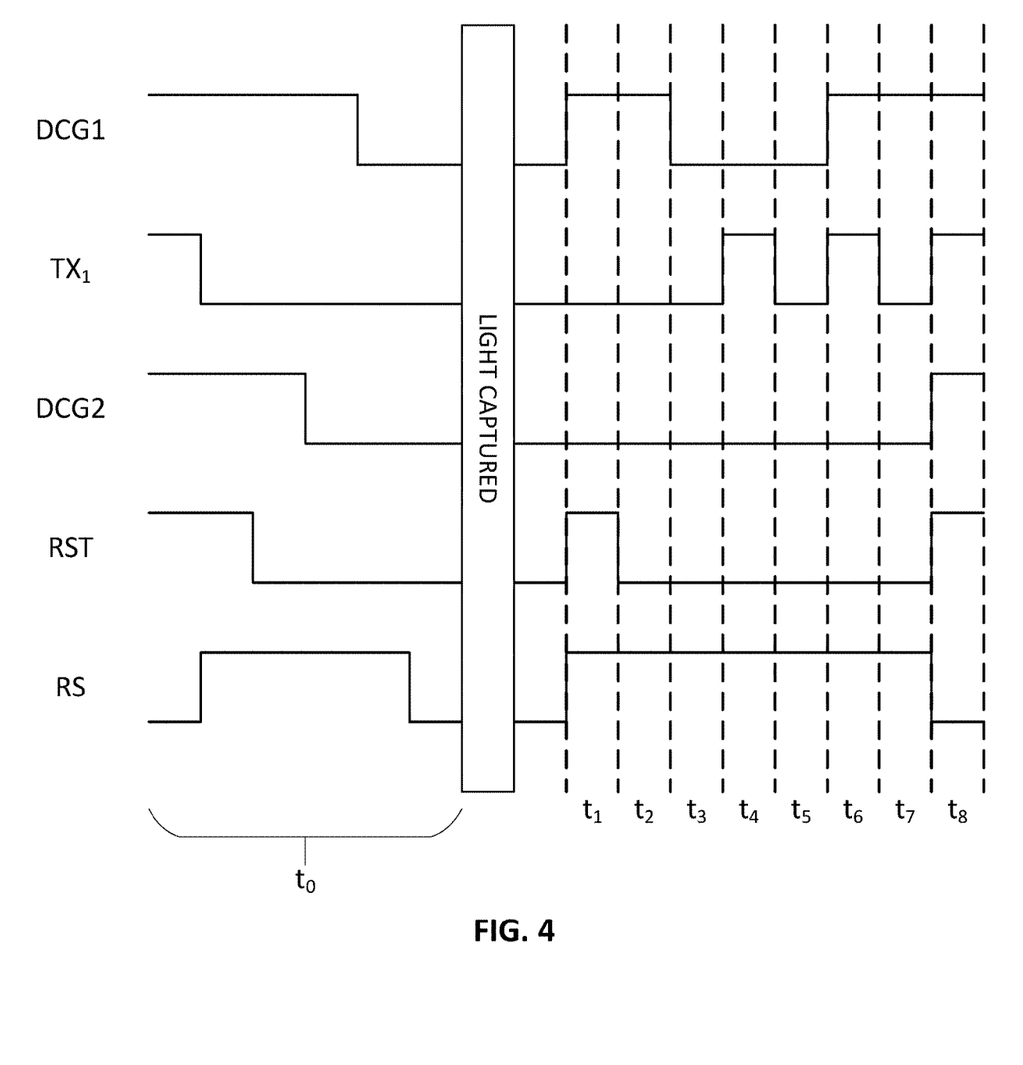
FIG. 4 is a timing diagram for various signals that control certain elements of the pixel circuit of FIG. 3 in a first operation mode, in accordance with an embodiment of the present disclosure.
Figure 5:
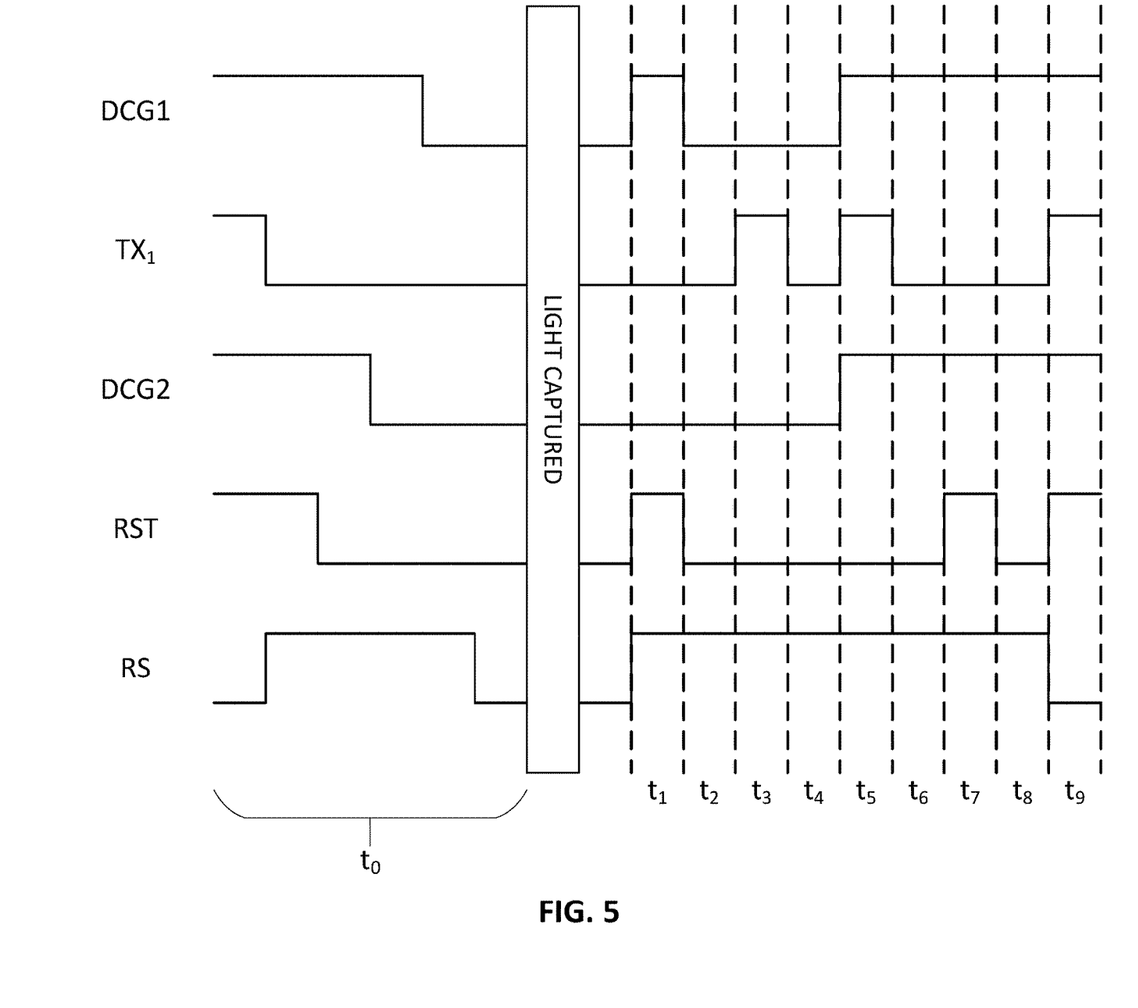
FIG. 5 is a timing diagram for various signals that control certain elements of the pixel circuit of FIG. 3 in a second operation mode, in accordance with an embodiment of the present disclosure.
Figure 6:
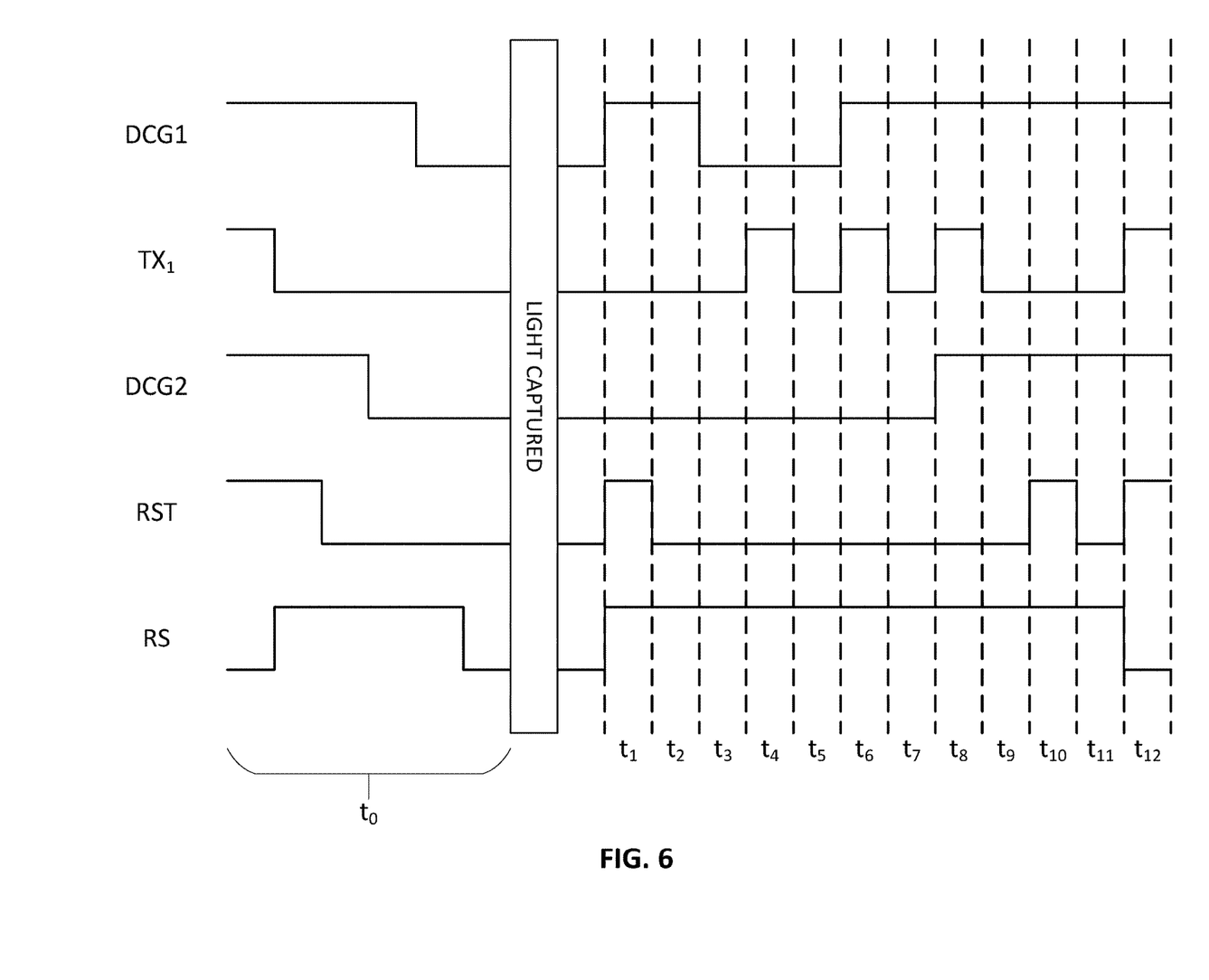
FIG. 6 is a timing diagram for various signals that control certain elements of the pixel circuit of FIG. 3 in a third operation mode, in accordance with an embodiment of the present disclosure.

FIGS. 4-6 provide example timing diagrams for the different aforementioned operation modes of the pixel circuit. FIG. 4 provides an example timing diagram for the various control signals during the first operation mode (e.g., only using capacitor Cfd). FIG. 5 provides an example timing diagram for the various control signals during the second operation mode (e.g., only using capacitor Cfd in parallel with capacitor Cg1). FIG. 6 provides an example timing diagram for the various control signals during the third operation mode (e.g., using capacitor Cfd in parallel with capacitor Cg1 in parallel with capacitor Cg2).

For any mode of operation, a same initialization time period $t_0$ may be used to reset the potential at various nodes around the circuit before the capturing of light occurs. During initialization time period $t_0$, RST is biased on while each of DCG1, DCG2, and $TX_1$ are also biased on for at least one clock cycle. During this time, all nodes coupled to DCG1, DCG2, and $TX_1$ are reset with the reset rail voltage VAA_RST. According to some embodiments, the various switches are then shut off in a sequence with $TX_1$ being biased off first, followed by DCG2, and then DCG1. During this process, row select RS may be biased on to read out the baseline values from the various nodes of the readout circuit.

Turning to FIG. 4, after light has been captured by the photodetector PD in the first mode of operation, row select RS is biased on to begin reading out data from the readout circuit at a first time period $t_1$. Also during this time, RST is biased on along with DCG1 to reset at least the sensing node SN and the second node N2. At a second time period $t_2$, a baseline reading is captured of the potential at both sensing node SN and the second node N2. At a third time period $t_3$, another baseline reading is captured for only the sensing node SN as DCG1 has been biased off. At a fourth time period t4, photodetector charge is released onto sensing node SN by biasing on $TX_1$. At a fifth time period $t_5$, $TX_1$ is biased off and a reading is captured of the charge stored across capacitor Cfd from sensing node SN since DCG1 is biased off. Since only capacitor Cfd is used, this reading has a relatively high conversion gain. At a sixth time period $t_6$, photodetector charge is released onto both sensing node SN and the second node N2 since DCG1 is also biased on along with $TX_1$. At a seventh time period $t_7$, $TX_1$ is biased off and a reading is captured of the charge stored across capacitor Cfd in parallel with capacitor Cg1 from sensing node SN and second node N2 since DCG1 is still biased on. Since capacitor Cfd in parallel with capacitor Cg1 are used, this reading has a lower conversion gain compared to the reading taken at fifth time period $t_5$. At an eighth time period $t_8$, all switches including RST are biased on to once again reset all nodes with the rail voltage VAA_RST. Since no reading is required at this time period, row select RS is biased off.

According to some embodiments, the baseline readings are compared to the signal readings to capture the difference associated with the amount of light impinging upon photodetector PD. For example, during the first mode of operation, the baseline reading captured at time period $t_2$ is compared to the signal reading captured at time period $t_7$, and the baseline reading captured at time period $t_3$ is compared to the signal reading captured at time period $t_5$. Note that, during the first mode of operation, DCG2 is not used during any of the readout operations.

Turning to FIG. 5, after light has been captured by the photodetector PD in the second mode of operation, row select RS is biased on to begin reading out data from the readout circuit at a first time period $t_1$. Also during this time, RST is biased on along with DCG1 to reset at least the sensing node SN and the second node N2. At a second time period $t_2$, a baseline reading is captured of the potential at sensing node SN. At a third time period $t_3$, photodetector charge is released onto sensing node SN by biasing on $TX_1$. At a fourth time period t4, $TX_1$ is biased off and a reading is captured of the charge stored across Cfd from sensing node SN since DCG1 is biased off. Since only capacitor Cfd is used, this reading has a relatively high conversion gain. At a fifth time period $t_5$, photodetector charge is released onto sensing node SN, the second node N2, and the third node N3 since both DCG1 and DCG2 are biased on along with $TX_1$. At a sixth time period $t_6$, $TX_1$ is biased off and a reading is captured of the charge stored across capacitor Cfd in parallel with capacitor Cg1 in parallel with capacitor Cg2 from sensing node SN, second node N2, and third node N3 since DCG1 and DCG2 are both still biased on. Since capacitor Cfd in parallel with capacitor Cg1 and in parallel with capacitor Cg2 are used, this reading has a lower conversion gain compared to the reading taken at the fourth time period $t_4$. At a seventh time period $t_7$, RST is biased on along with both DCG1 and DCG2 to reset the potential at each of sensing node SN, second node N2, and third node N3. At an eighth time period $t_8$, a baseline reading is captured of the potential at sensing node SN, second node N2, and third node N3 since both DCG1 and DCG2 are biased on. At a ninth time period $t_9$, all switches including RST are biased on to once again reset all nodes with the rail voltage VAA_RST. Since no reading is required at this time period, row select RS is biased off.

According to some embodiments, the baseline readings are compared to the signal readings to capture the difference associated with the amount of light impinging upon photodetector PD. For example, during the second mode of operation, the baseline reading captured at time period $t_2$ is compared to the signal reading captured at time period $t_4$, and the baseline reading captured at time period $t_8$ is compared to the signal reading captured at time period $t_6$. In some embodiments, during the second mode of operation, DCG2 can simply remain biased on following the capture of light at photodetector PD.

Turning to FIG. 6, after light has been captured by the photodetector PD in the third mode of operation, row select RS is biased on to begin reading out data from the readout circuit at a first time period $t_1$. Also during this time, RST is biased on along with DCG1 to reset at least the sensing node SN and the second node N2. At a second time period $t_2$, a baseline reading is captured of the potential at sensing node SN and at the second node N2 since DCG1 is still biased on. At a third time period $t_3$, a baseline reading is captured of the potential at sensing node SN, but not also at second node N2 since DCG1 is biased off. At a fourth time period t4, photodetector charge is released onto sensing node SN by biasing on $TX_1$. At a fifth time period $t_5$, $TX_1$ is biased off and a reading is captured of the charge stored across Cfd from sensing node SN since DCG1 is biased off. Since only capacitor Cfd is used, this reading has a relatively high conversion gain. At a sixth time period $t_6$, photodetector charge is released onto sensing node SN and the second node N2, but not onto the third node N3 since DCG1 is biased on along with $TX_1$ and DCG2 is biased off. At a seventh time period $t_7$, $TX_1$ is biased off and a reading is captured of the charge stored across capacitor Cfd in parallel with capacitor Cg1 from sensing node SN and second node N2 since DCG1 is biased on and DCG2 is biased off. Since capacitor Cfd in parallel with capacitor Cg1 are used, this reading has a lower conversion gain compared to the reading taken at the fifth time period $t_5$. At an eighth time period $t_8$, photodetector charge is released onto sensing node SN, second node N2, and third node N3 since both DCG1 and DCG2 are biased on along with $TX_1$. At a ninth time period $t_9$, $TX_1$ is biased off and a reading is captured of the charge stored across capacitor Cfd in parallel with capacitor Cg1 in parallel with capacitor Cg2 from sensing node SN second node N2, and third node N3 since both DCG1 and DCG2 are biased on. Since capacitor Cfd in parallel with capacitor Cg1 in parallel with capacitor Cg2 are used, this reading has a lower conversion gain compared to the reading taken at the seventh time period $t_7$. At a tenth time period $t_{10}$, RST is biased on along with both DCG1 and DCG2 to reset the potential at each of sensing node SN, second node N2, and third node N3. At an eleventh time period $t_{11}$, a baseline reading is captured of the potential at sensing node SN, second node N2, and third node N3 since both DCG1 and DCG2 are biased on. At a twelfth time period $t_{12}$, all switches including RST are biased on to once again reset all nodes with the rail voltage VAA_RST. Since no reading is required at this time period, row select RS is biased off.

According to some embodiments, the baseline readings are compared to the signal readings to capture the difference associated with the amount of light impinging upon photodetector PD. For example, during the third mode of operation, the baseline reading captured at time period $t_2$ is compared to the signal reading captured at time period $t_7$, the baseline reading captured at time period $t_3$ is compared to the signal reading captured at time period $t_5$, and the baseline reading captured at time period $t_{11}$ is compared to the signal reading captured at time period $t_9$. According to some embodiments, DCG2 may be used in conjunction with DCG1 to generate three different signal readouts with different conversion gains.

Example Computing Platform

Figure 7:
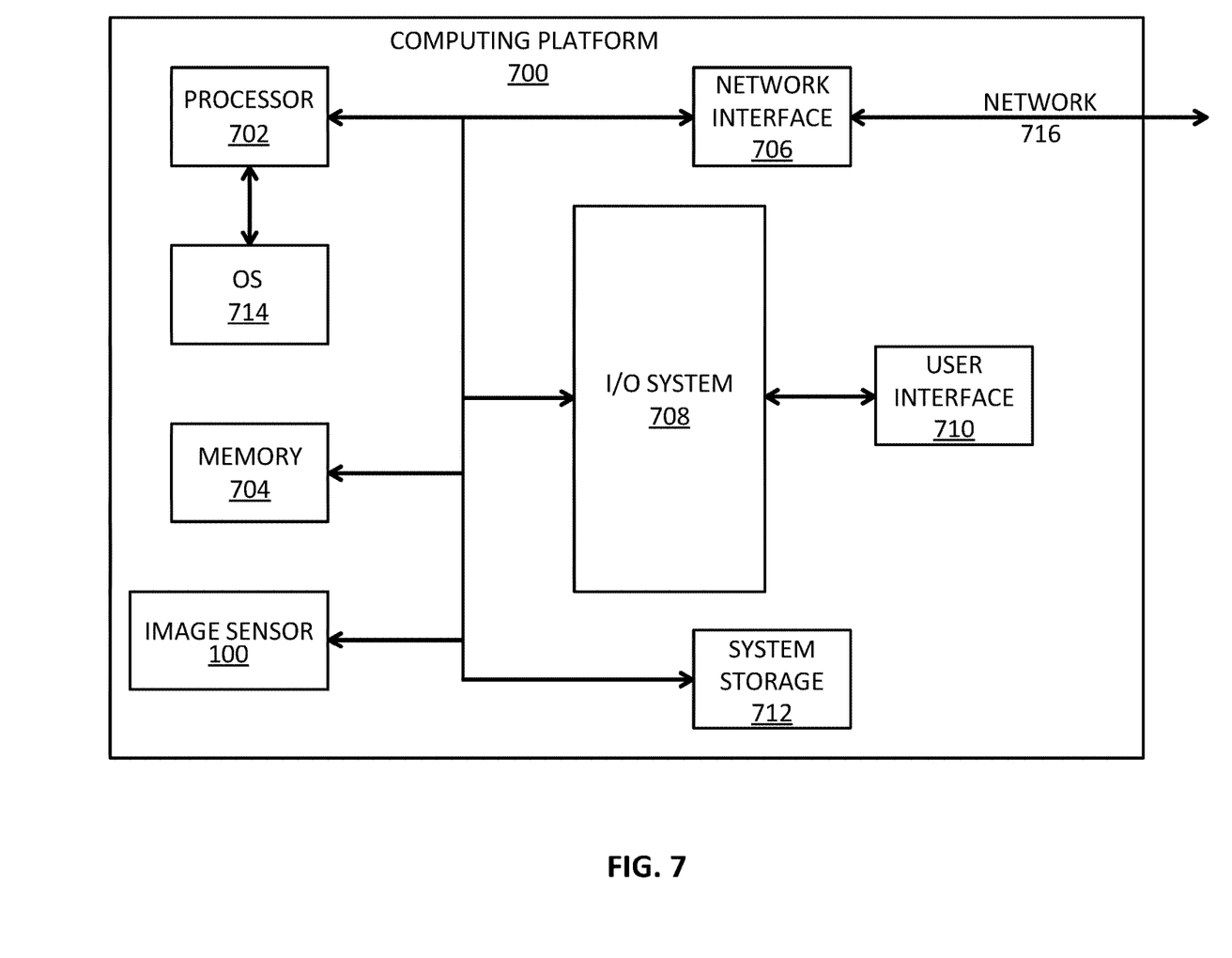
FIG. 7 illustrates an example computing platform that may include the image sensor of FIG. 1, in accordance with an embodiment of the present disclosure.

FIG. 7 illustrates an example computing platform 700 that interfaces with image sensor 100, configured in accordance with certain embodiments of the present disclosure. In some embodiments, computing platform 700 may host, or otherwise be incorporated into a personal computer, workstation, server system, laptop computer, ultra-laptop computer, tablet, touchpad, portable computer, handheld computer, palmtop computer, personal digital assistant (PDA), cellular telephone, combination cellular telephone and PDA, smart device (for example, smartphone or smart tablet), mobile internet device (MID), messaging device, data communication device, imaging device, wearable device, embedded system, and so forth. Any combination of different devices may be used in certain embodiments. Computing platform 700 may host a controlled area network (CAN) used on board a vehicle. In some embodiments, computing platform 700 represents one system in a network of systems coupled together via a CAN bus.

In some embodiments, computing platform 700 may comprise any combination of a processor 702, a memory 704, image sensor 100, a network interface 706, an input/output (I/O) system 708, a user interface 710, and a storage system 712. In some embodiments, one or more components of image sensor 100 are implemented as part of processor 702. As can be further seen, a bus and/or interconnect is also provided to allow for communication between the various components listed above and/or other components not shown. Computing platform 700 can be coupled to a network 716 through network interface 706 to allow for communications with other computing devices, platforms, or resources. Other componentry and functionality not reflected in the block diagram of FIG. 7 will be apparent in light of this disclosure, and it will be appreciated that other embodiments are not limited to any particular hardware configuration.

Processor 702 can be any suitable processor and may include one or more coprocessors or controllers to assist in control and processing operations associated with computing platform 700. In some embodiments, processor 702 may be implemented as any number of processor cores. The processor (or processor cores) may be any type of processor, such as, for example, a micro-processor, an embedded processor, a digital signal processor (DSP), a graphics processor (GPU), a network processor, a field programmable gate array or other device configured to execute code. The processors may be multithreaded cores in that they may include more than one hardware thread context (or "logical processor") per core.

Memory 704 can be implemented using any suitable type of digital storage including, for example, flash memory and/or random access memory (RAM). In some embodiments, memory 704 may include various layers of memory hierarchy and/or memory caches as are known to those of skill in the art. Memory 704 may be implemented as a volatile memory device such as, but not limited to, a RAM, dynamic RAM (DRAM), or static RAM (SRAM) device. Storage system 712 may be implemented as a non-volatile storage device such as, but not limited to, one or more of a hard disk drive (HDD), a solid-state drive (SSD), a universal serial bus (USB) drive, an optical disk drive, tape drive, an internal storage device, an attached storage device, flash memory, battery backed-up synchronous DRAM (SDRAM), and/or a network accessible storage device. In some embodiments, storage system 712 may comprise technology to increase the storage performance enhanced protection for valuable digital media when multiple hard drives are included.

Processor 702 may be configured to execute an Operating System (OS) 714 which may comprise any suitable operating system, such as Google Android (Google Inc., Mountain View, CA), Microsoft Windows (Microsoft Corp., Redmond, WA), Apple OS X (Apple Inc., Cupertino, CA), Linux, or a real-time operating system (RTOS). As will be appreciated in light of this disclosure, the techniques provided herein can be implemented without regard to the particular operating system provided in conjunction with computing platform 700, and therefore may also be implemented using any suitable existing or subsequently-developed platform.

Network interface 706 can be any appropriate network chip or chipset which allows for wired and/or wireless connection between other components of computing platform 700 and/or network 716, thereby enabling computing platform 700 to communicate with other local and/or remote computing systems, servers, cloud-based servers, and/or other resources. Wired communication may conform to existing (or yet to be developed) standards, such as, for example, Ethernet. Wireless communication may conform to existing (or yet to be developed) standards, such as, for example, cellular communications including LTE (Long Term Evolution), Wireless Fidelity (Wi-Fi), Bluetooth, and/or Near Field Communication (NFC). Exemplary wireless networks include, but are not limited to, wireless local area networks, wireless personal area networks, wireless metropolitan area networks, cellular networks, and satellite networks.

I/O system 708 may be configured to interface between various I/O devices and other components of computing platform 700. I/O devices may include, but not be limited to, a user interface 710. User interface 710 may include devices (not shown) such as a display element, touchpad, keyboard, mouse, and speaker, etc. I/O system 708 may include a graphics subsystem configured to perform processing of images for rendering on a display element. Graphics subsystem may be a graphics processing unit or a visual processing unit (VPU), for example. An analog or digital interface may be used to communicatively couple graphics subsystem and the display element. For example, the interface may be any of a high definition multimedia interface (HDMI), DisplayPort, wireless HDMI, and/or any other suitable interface using wireless high definition compliant techniques. In some embodiments, the graphics subsystem could be integrated into processor 702 or any chipset of computing platform 700.

It will be appreciated that in some embodiments, the various components of the computing platform 700 may be combined or integrated in a system-on-a-chip (SoC) architecture. In some embodiments, the components may be hardware components, firmware components, software components or any suitable combination of hardware, firmware or software.

In various embodiments, computing platform 700 may be implemented as a wireless system, a wired system, or a combination of both. When implemented as a wireless system, computing platform 700 may include components and interfaces suitable for communicating over a wireless shared media, such as one or more antennae, transmitters, receivers, transceivers, amplifiers, filters, control logic, and so forth. An example of wireless shared media may include portions of a wireless spectrum, such as the radio frequency spectrum and so forth. When implemented as a wired system, computing platform 700 may include components and interfaces suitable for communicating over wired communications media, such as input/output adapters, physical connectors to connect the input/output adaptor with a corresponding wired communications medium, a network interface card (NIC), disc controller, video controller, audio controller, and so forth. Examples of wired communications media may include a wire, cable metal leads, printed circuit board (PCB), backplane, switch fabric, semiconductor material, twisted pair wire, coaxial cable, fiber optics, and so forth.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical quantities within the registers, memory units, or other such information storage transmission or displays of the computer system. The embodiments are not limited in this context.

The terms "circuit" or "circuitry," as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., non-volatile) in memory devices. The circuitry may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc. Other embodiments may be implemented as software executed by a programmable control device. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Various embodiments may be implemented using hardware elements, software elements, or a combination of both. Examples of hardware elements may include processors, microprocessors, circuits, circuit elements (for example, transistors, resistors, capacitors, inductors, and so forth), integrated circuits, ASICs, programmable logic devices, digital signal processors, FPGAs, GPUs, logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

Further Example Embodiments

The following examples pertain to further embodiments, from which numerous permutations and configurations will be apparent.

Example 1 is a charge coupled device (CCD) that includes a plurality of pixels. At least one pixel of the plurality of pixels includes a photodetector, a transfer gate coupled to an output of the photodetector, and a gain mode select block coupled to an output of the transfer gate. The gain mode select block includes a first switch coupled between a first node and a second node, and a second switch coupled between the second node and a third node. The first node is coupled to a first capacitor and the second node is coupled to a second capacitor. The third node is coupled to a third capacitor.

Example 2 includes the CCD of Example 1, wherein the transfer gate is coupled to the first node of the gain mode select block.

Example 3 includes the CCD of Example 1 or 2, wherein the first switch and the second switch are each field effect transistors (FETs).

Example 4 includes the CCD of Example 3, wherein the first switch has substantially the same width/length (W/L) ratio as the second switch.

Example 5 includes the CCD of any one of Examples 1-4, further comprising a resistive element coupled between the output of the photodetector and the third node.

Example 6 includes the CCD of Example 5, wherein the resistive element is a FET.

Example 7 includes the CCD of any one of Examples 1-6, wherein the third capacitor has a higher capacitance than the second capacitor, and the second capacitor has a higher capacitance than the first capacitor.

Example 8 includes the CCD of any one of Examples 1-7, further comprising a reset switch coupled to any node of the gain mode select block.

Example 9 is an image sensor that includes a pixel array having at least one column of addressable pixels, a column amplifier coupled to the at least one column of addressable pixels, an analog-to-digital converter (ADC) coupled to the column amplifier, and a processor coupled to the ADC. The at least one column of addressable pixels includes at least one pixel that includes a photodetector, a transfer gate coupled to an output of the photodetector, and a gain mode select block coupled to an output of the transfer gate. The gain mode select block includes a first switch coupled between a first node and a second node, and a second switch coupled between the second node and a third node. The first node is coupled to a first capacitor and the second node is coupled to a second capacitor. The third node is coupled to a third capacitor.

Example 10 includes the image sensor of Example 9, wherein the transfer gate is coupled to the first node of the gain mode select block.

Example 11 includes the image sensor of Example 9 or 10, wherein the first switch and the second switch are each field effect transistors (FETs).

Example 12 includes the image sensor of Example 11, wherein the first switch has substantially the same width/length (W/L) ratio as the second switch.

Example 13 includes the image sensor of any one of Examples 9-12, wherein the at least one pixel further comprises a resistive element coupled between the output of the photodetector and the third node.

Example 14 includes the image sensor of Example 13, wherein the resistive element is a FET.

Example 15 includes the image sensor of any one of Examples 9-14, wherein the third capacitor has a higher capacitance than the second capacitor, and the second capacitor has a higher capacitance than the first capacitor.

Example 16 includes the image sensor of any one of Examples 9-15, wherein the at least one pixel further comprises a reset switch coupled to any node of the gain mode select block.

Example 17 is a pixel of a pixel array within a CCD device. The pixel includes a photodetector, a transfer gate having a first terminal coupled to an output of the photodetector, a first capacitor coupled to a second terminal of the transfer gate, a first switch having a first terminal coupled to the second terminal of the transfer gate, a second capacitor coupled to a second terminal of the first switch, a second switch having a first terminal coupled to the second terminal of the first switch, and a third capacitor coupled to a second terminal of the second switch.

Example 18 includes the pixel of Example 17, further comprising a resistive element coupled between the output of the photodetector and the second terminal of the second switch.

Example 19 includes the pixel of Example 18, wherein the resistive element is a FET.

Example 20 includes the pixel of any one of Examples 17-19, wherein the third capacitor has a higher capacitance than the second capacitor, and the second capacitor has a higher capacitance than the first capacitor.

Example 21 includes the pixel of any one of Examples 17-20, wherein the second terminal of the transfer gate is further coupled to a gate of an amplifier FET.

Example 22 includes the pixel of any one of Examples 17-21, wherein the first switch and the second switch are each field effect transistors (FETs).

Example 23 includes the pixel of Example 22, wherein the first switch has substantially the same width/length (W/L) ratio as the second switch.

Example 24 includes the pixel of any one of Examples 17-23, further comprising a reset switch coupled to the second terminal of the first switch.

Numerous specific details have been set forth herein to provide a thorough understanding of the embodiments. It will be understood by an ordinarily-skilled artisan, however, that the embodiments may be practiced without these specific details. In other instances, well known operations, components and circuits have not been described in detail so as not to obscure the embodiments. It can be appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

What is claimed is:

1. A charge coupled device (CCD), comprising:
   a plurality of pixels, wherein at least one pixel of the plurality of pixels comprises
   a photodetector;
   a transfer gate coupled to an output of the photodetector; and
   a gain mode select block coupled to an output of the transfer gate, wherein the gain mode select block comprises
   a first switch coupled between a first node and a second node, the first node coupled to a first capacitor and the second node coupled to a second capacitor, and
   a second switch coupled between the second node and a third node, the third node coupled to a third capacitor, wherein the third capacitor has a higher capacitance than the second capacitor, and the second capacitor has a higher capacitance than the first capacitor.

2. The CCD of claim 1, wherein the transfer gate is coupled to the first node of the gain mode select block.

3. The CCD of claim 1, wherein the first switch and the second switch are each field effect transistors (FETs).

4. The CCD of claim 3, wherein the first switch has substantially the same width/length (W/L) ratio as the second switch.

5. The CCD of claim 1, further comprising a resistive element coupled between the output of the photodetector and the third node.

6. The CCD of claim 5, wherein the resistive element is a FET.

7. The CCD of claim 1, further comprising a reset switch coupled to any node of the gain mode select block.

8. An image sensor, comprising:
   a pixel array having at least one column of addressable pixels;
   a column amplifier coupled to the at least one column of addressable pixels;
   an analog-to-digital converter (ADC) coupled to the column amplifier; and
   a processor coupled to the ADC;
   wherein the at least one column of addressable pixels includes at least one pixel that comprises
   a photodetector;
   a transfer gate coupled to an output of the photodetector; and
   a gain mode select block coupled to an output of the transfer gate, wherein the gain mode select block comprises
   a first switch coupled between a first node and a second node, the first node coupled to a first capacitor and the second node coupled to a second capacitor, and
   a second switch coupled between the second node and a third node, the third node coupled to a third capacitor, wherein the third capacitor has a higher capacitance than the second capacitor, and the second capacitor has a higher capacitance than the first capacitor.

9. The image sensor of claim 8, wherein the transfer gate is coupled to the first node of the gain mode select block.

10. The image sensor of claim 8, wherein the first switch and the second switch are each field effect transistors (FETs).

11. The image sensor of claim 8, wherein the at least one pixel further comprises a resistive element coupled between the output of the photodetector and the third node.

12. The image sensor of claim 11, wherein the resistive element is a FET.

13. The image sensor of claim 8, wherein the at least one pixel further comprises a reset switch coupled to any node of the gain mode select block.

14. A pixel of a pixel array within a CCD device, the pixel comprising:
   a photodetector;
   a transfer gate having a first terminal coupled to an output of the photodetector;
   a first capacitor coupled to a second terminal of the transfer gate;
   a first switch having a first terminal coupled to the second terminal of the transfer gate;
   a second capacitor coupled to a second terminal of the first switch;
   a second switch having a first terminal coupled to the second terminal of the first switch; and
   a third capacitor coupled to a second terminal of the second switch, wherein the third capacitor has a higher capacitance than the second capacitor, and the second capacitor has a higher capacitance than the first capacitor.

15. The pixel of claim 14, further comprising a resistive element coupled between the output of the photodetector and the second terminal of the second switch.

16. The pixel of claim 15, wherein the resistive element is a FET.

17. The pixel of claim 14, wherein the second terminal of the transfer gate is further coupled to a gate of an amplifier FET.

* * * * *